United States Patent [19]

Gordiski

[11] 4,441,281
[45] Apr. 10, 1984

[54] PULSE CANCELLATION CIRCUITRY

[75] Inventor: Ronald J. Gordiski, Ansonia, Conn.

[73] Assignee: USM Corporation, Farmington, Conn.

[21] Appl. No.: 362,597

[22] Filed: Mar. 29, 1982

[51] Int. Cl.³ .............................................. B24B 51/00
[52] U.S. Cl. ..................................... 51/165.87; 51/49; 318/571; 318/572; 364/475
[58] Field of Search ....................... 318/571, 572, 632; 51/49, 165 R, 165.87, 165.71, 165.88; 364/475

[56] References Cited

U.S. PATENT DOCUMENTS 3,940,675  2/1976  Schroeder ............................ 318/572
3,971,168  7/1976  Nishimura .......................... 51/165.87
4,214,191  7/1980  Watanabe ............................ 318/572
4,218,850  8/1980  Sakai ....................................... 51/49

FOREIGN PATENT DOCUMENTS

1468075  3/1973  United Kingdom .
1500031  2/1978  United Kingdom .
1532067  11/1978  United Kingdom .

*Primary Examiner*—Harold D. Whitehead
*Attorney, Agent, or Firm*—William F. White

[57] ABSTRACT

A digital control system for a roll grinding machine controls the infeed of the grinding wheel in a manner which minimizes the impact of momentary changes in infeed command. The momentary change in infeed command which is effectively controlled is that of a pulse compensation introduced for the wear of the grinding wheel.

20 Claims, 8 Drawing Figures

Timing Diagram – Pulse Cancellation

Compensation Pulse Signal

Latch Signal

Reverse Motor Control Pulse Train Signal

Pulse Cancellation Signal

Delayed Reverse Motor Control Pulse Train Signal

Gated Motor Control Pulse Train Signal

PULSE CANCELLATION CIRCUITRY

FIELD OF THE INVENTION

This invention relates to the automatic control of roll grinders. In particular, this invention relates to the automatic control of the infeed motion of one or more grinding wheels within a roll grinding machine.

BACKGROUND OF THE INVENTION

Machines which grind the surface of a roll to within very close dimensional tolerances are generally known as roll grinding machines. These machines are capable of defining particular contours such as the well-known crown contour along the length of the roll. To achieve these ends, roll grinding machines employ sophisticated mechanisms which position the grinding tool relative to the workpiece roll. These mechanisms include an infeed device which moves the grinding wheel toward the workpiece until a predefined grinding depth has been reached.

The systems employed in the past to move the grinding wheel have usually consisted of complex mechanical arrangements. The complexity of these mechanical arrangements has often been attributable to the number of different types of infeed that may be necessary during a roll grinding operation. For instance, the mechanical infeed arrangements may be called upon to implement several different types of infeed either simultaneously or selectively while proceeding along the length of the workpiece. These types of infeed may be required in conjunction with the overall grinding profile that is to be accomplished. This has necessarily led to rather complex mechanical arrangements that are capable of responding to all these various possibilities. This has in turn often led to the deployment of a number of different motors to perform specified types of infeed. The motors are usually accommodated within the mechanical arrangements in such a manner so as to compound or superimpose their separate drive functions. The motors also had their separate and individual controls associated therewith. These controls have usually been only responsive to one or two different types of infeed commands. The separately dedicated control systems have for the most part not been inter-related. In other words, there has heretofore not been a single motor control system which has been capable of implementing all types of infeed commands which may be necessary in a roll grinding application.

A single motor control system has been disclosed in U.S. patent application Ser. No. 108,338, entitled "Control Apparatus for Roll Grinders", dated Dec. 31, 1979, and now U.S. Pat. No. 4,371,941, dated Feb. 1, 1953. This control system includes a digital command circuit which responds to forward and reverse digital commands coming from a number of different sources. The digital command output circuit in turn generates forward and reverse pulses to a single motor which moves the grinding wheel inwardly or outwardly relative to a workpiece. These generated pulses may occur in such a manner as to cause abrupt reversals in the motor. It has been found that this occurs in a mode of operation wherein wheel wear compensation is being effected during the grinding of a profile on the workpiece.

OBJECTS OF THE INVENTION

It is an object of this invention to provide a roll grinding machine with an improved electronic control system which can process simultaneous digital commands in an improved manner.

It is another object of this invention to provide an electronic control system with the capability of implementing a grinding profile through pulse control while simultaneously compensating for wear of the grinding tool.

It is yet another object of this invention to provide an electronic control system with the capability of selectively processing control signals for a motor so as to selectively eliminate momentary changes in commanded direction of movement.

SUMMARY OF THE INVENTION

The above and other objects of the invention are achieved by providing a roll grinding machine with a digital control system which minimizes the impact of momentary changes in infeed command. In particular, the digital control system is operative to note when a pulse pertaining to the correction for the wear in the grinding wheel occurs. In the event that the grinding wheel is then moving in a forward infeed direction, the pulse will be merely gated in an additive fashion with the other forward infeed pulses. On the other hand, if the grinding wheel is then moving in a reverse infeed direction, the correction pulse will be applied to a pulse cancellation circuit. The pulse cancellation circuit thereafter cancels a pulse in a train of pulses dictating the reverse infeed direction of movement for the grinding wheel. In this manner, the periodically occurring pulse correction for wheel wear is appropriately processed so as to preclude reversals of the single motorized drive.

BRIEF DESCRIPTION OF THE DRAWINGS

The above and other features of the invention will now be particularly described with reference to the accompanying drawings, in which.

DESCRIPTION OF THE PREFERRED EMBODIMENT

Figure 1A:
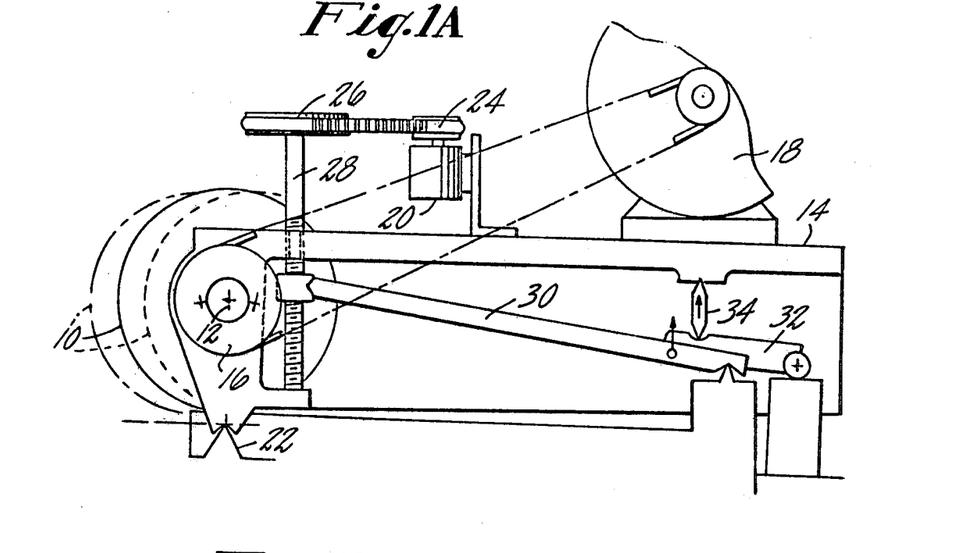
FIGS. 1A and 1B are illustrations of a pivotal infeed arrangement having a single motorized drive for moving the grinding tool relative to the workpiece.

Referring to FIG. 1A, a schematic showing of a pivotal infeed arrangement for a grinding wheel 10 is illustrated. The tilting motion of the grinding wheel 10 is depicted by several dotted outline positions of the wheel. It is to be understood that these positions represent respective inward and outward positions of the grinding wheel relative to a workpiece which is not shown. It is to be furthermore understood that the pivotal arrangement of FIG. 1A is preferably mounted on a carriage in a conventional manner within a roll grinding machine. In this regard, the carriage traverses the length of the workpiece which is normally a rotatably mounted calendar roll within the roll grinding machine. The amount of inward or outward positioning of the grinding wheel relative to the calendar roll dictates the degree of grinding along the length of the roll.

Figure 1B:
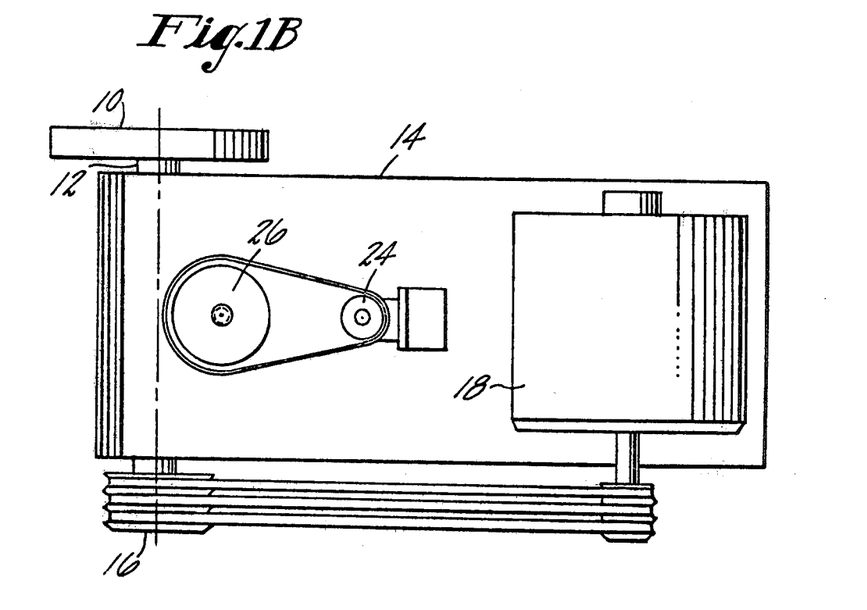

Referring now to FIG. 1B, the grinding wheel 10 is further illustrated in a top view of the pivotal infeed arrangement. The grinding wheel 10 is seen to be affixed to a shaft 12 which is rotatably mounted within a platform 14. A pulley 16, mounted on the opposite end of the shaft 12, is belt driven by a grinding wheel motor 18. The wheel motor 18 is preferably a variable speed motor having the capability of driving the grinding wheel 10 at different speeds as may be required during the course of various grinding operations.

Referring now to FIG. 1A, it is seen that an infeed motor 20 is mounted to the top of the platform 14. The infeed motor 20 is also a variable speed motor capable of defining variable infeed rates of the grinding wheel 10 relative to the workpiece. This infeed is accomplished by pivoting the platform 14 about a fulcrum point 22 so as to thereby define inward or outward movement of the grinding wheel 10 relative to the workpiece.

The output shaft of the infeed motor 20 is connected to a pulley drive arrangement comprising a set of pulleys 24 and 26 which turn a ball screw 28. The rotation of the ball screw 28 causes a feed lever 30 to move vertically upward or downward which in turn causes a pivotally connected lever 32 to move vertically. The vertical motion of the lever 32 is imparted to the platform 14 via a free-standing vertical member 34. The result is that an upward motion of the feed lever 30 will produce a pivotal motion of the platform 14 about the fulcrum point 22 so as to produce an infeed of the grinding wheel 10 with respect to the workpiece. On the other hand, a reversal of the infeed motor 20 will cause the feed lever 30 to move downwardly so as to thereby pivot the platform 14 clockwise about the fulcrum point 22 so as to thereby retract the grinding wheel 10 from the workpiece.

Figure 2:
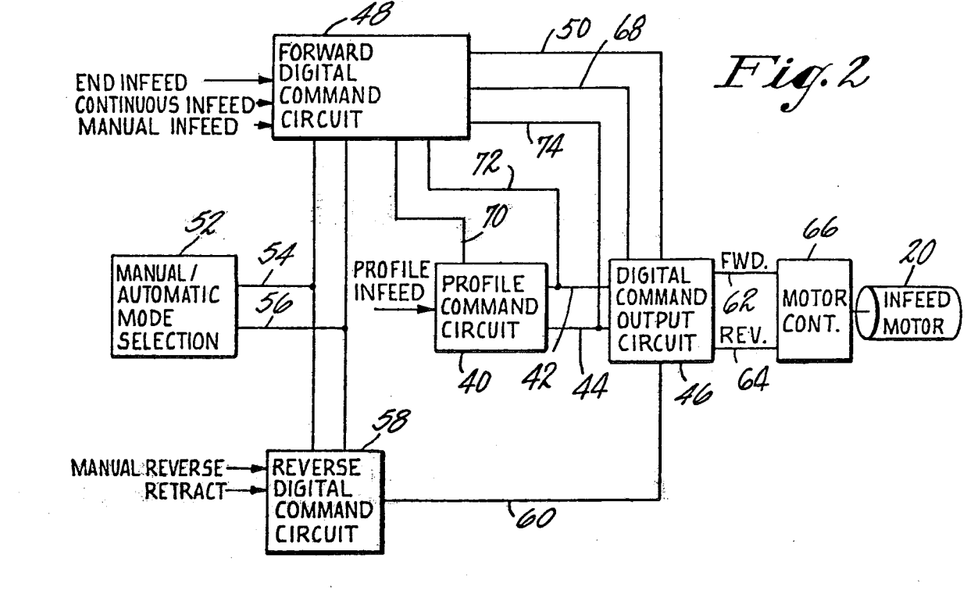
FIG. 2 is a block diagram of a digital control system for the single motorized drive.

Referring to FIG. 2, a control system for the pivotal infeed arrangement of FIGS. 1A and 1B is illustrated in block diagram form.

The control system is seen to interface with the wheel motor 18 and the infeed motor 20 of the pivotal infeed arrangement. As will become apparent hereinafter, the control system of FIG. 2 operatively controls the infeed motor 20 in response to various external infeed commands which are applied thereto.

The various external infeed commands which are applied to the control system are: profile infeed, end infeed, continuous infeed, manual infeed, manual reverse, and retract. It is to be understood that each of these external commands defines a specific type of infeed that is to be performed. The commands may be either separately or conjunctively commanded by activation of switches within the particular command circuits. These switches can be manually activated by an operator, or, in the alternative, they could be activated automatically by a higher order control system.

A profile command circuit 40 is responsive to a switch activation indicated as a profile infeed. The profile command circuit is thereafter operative to produce pulses on either of a pair of output lines 42 and 44. As will be explained in detail hereinafter, the pulses appearing on the output line 42 will be interpreted as a forward profile command whereas the pulses appearing on the output line 44 will be interpreted as a reverse profile command. The pulses present on the lines 42 and 44 are applied to a digital command output circuit 46 which is operative to appropriately interpret these pulses.

In addition to receiving the profile command pulses on the lines 42 and 44, the digital command output circuit 46 also receives certain other forward and reverse command pulses. In particular, a forward digital command circuit 48 is operative to generate pulses on a line 50 in response to various activated infeed commands. These commands include an end infeed, a continuous infeed, and a manual infeed. The end infeed command is activated at each end of the workpiece roll so as to initiate a fresh cut. The continuous infeed is normally activated during the entire grinding operation so as to bias the grinding wheel toward the workpiece roll at a preset uniform rate so as to thereby compensate for wear of the grinding wheel. The manual infeed is a discretionary operator command which overrides the other forward infeed commands. The manual infeed override is accomplished by first selecting the manual mode of operation through a manual/automatic mode selection circuit 52. The manual/automatic mode selection circuit will generate a logically high signal on a line 54 and a logically low signal on a line 56 indicating the selection of a manual mode of operation. The signal levels will be reversed for the selection of an automatic mode of operation. As will be explained in detail hereinafter, the internal logic within the forward digital command circuit 48 is responsive to the signals present on the lines 54 and 56 so as to be in the proper mode of operation.

The manual and automatic signal indications on the lines 54 and 56 are also applied to a reverse digital command circuit 58. The reverse digital command circuit 58 furthermore receives certain external commands denoted as manual reverse and retract. The manual reverse merely allows the operator to intervene in an override fashion and arbitrarily reverse the infeed motion of the grinding wheel. The retract command is a rapid and total removal of the grinding wheel from the workpiece during an automatic mode of operation. As has been previously discussed with regard to the forward digital command circuit 48, the internal logic of the reverse digital command circuit 58 will be responsive to the signals present on the lines 54 and 56 so as to be in the proper mode of operation. The reverse digital command circuit is in each instance operative to generate a train of reverse command pulses on a line 60. These reverse command pulses on the line 60 are applied to the digital command output circuit 46.

Referring now to the digital command output circuit 46, it will be remembered that this circuit receives forward profile command pulses on the line 42 and forward command pulses on the line 50. The digital command output circuit 46 furthermore receives reverse profile command pulses on the line 44 as well as reverse command pulses on the line 60.

The digital command output circuit is operative to generate a forward motor control pulse on a line 62 in response to receiving a pulse on either the line 42 or the line 50. The digital command output circuit 46 is also operative to generate a reverse motor control pulse on a line 64 in response to receiving a pulse on either the line 44 or the line 60. These pulses are applied to a motor control 66 which in turn controls the infeed motor 20. It is to be noted that the motor control 66 represents a standard interface for receiving control signal pulses over two different lines.

It is to be noted that the infeed motor 20 and the motor control 66 are available in standard configurations from companies such as Superior Electric of Bristol, Connecticut and Aerotech Inc. of Pittsburgh, Pa. The motor controls offered by these companies are capable of receiving and processing pulses received on two lines such as 62 and 64. The infeed motor 20 is subsequently operative to implement a forward infeed motion of the grinding wheel 10 in FIG. 1A in response to forward control signal pulses on the line 62. The infeed motor 20 is also operative to implement a reverse motion of the grinding wheel 10 in response to reverse control signal pulses occurring on the line 64.

It is to be noted that the digital command output circuit 46 also interfaces with the forward digital command circuit 48 via a line 68. The forward digital command circuit 48 furthermore interfaces with the profile command circuit 40 via a line 70. Finally, it is to noted that the forward digital command circuit 48 is connected to the output lines 42 and 44 of the profile command circuit 40 via a pair of lines 72 and 74. As will be explained in detail hereinafter, the forward digital command circuit 48 is operative to normally transmit a pulse resulting from a continuous infeed command onto the line 50. This normal pulse transmission will occur when the profile command circuit 40 is generating forward profile command pulses. The digital command output circuit 46 will otherwise receive the pulse resulting from a continuous infeed command on the line 68. This pulse will be processed by the digital command output circuit in a manner which allows for the cancellation of a reverse motor control pulse that would otherwise issue on the line 64. In this manner, the motor control 66 will not directly experience a forward motor control pulse correction for wear of the grinding wheel when the grinding wheel is being smoothly retracted in response to a train of reverse motor control pulses appearing on the line 64.

Figure 3:
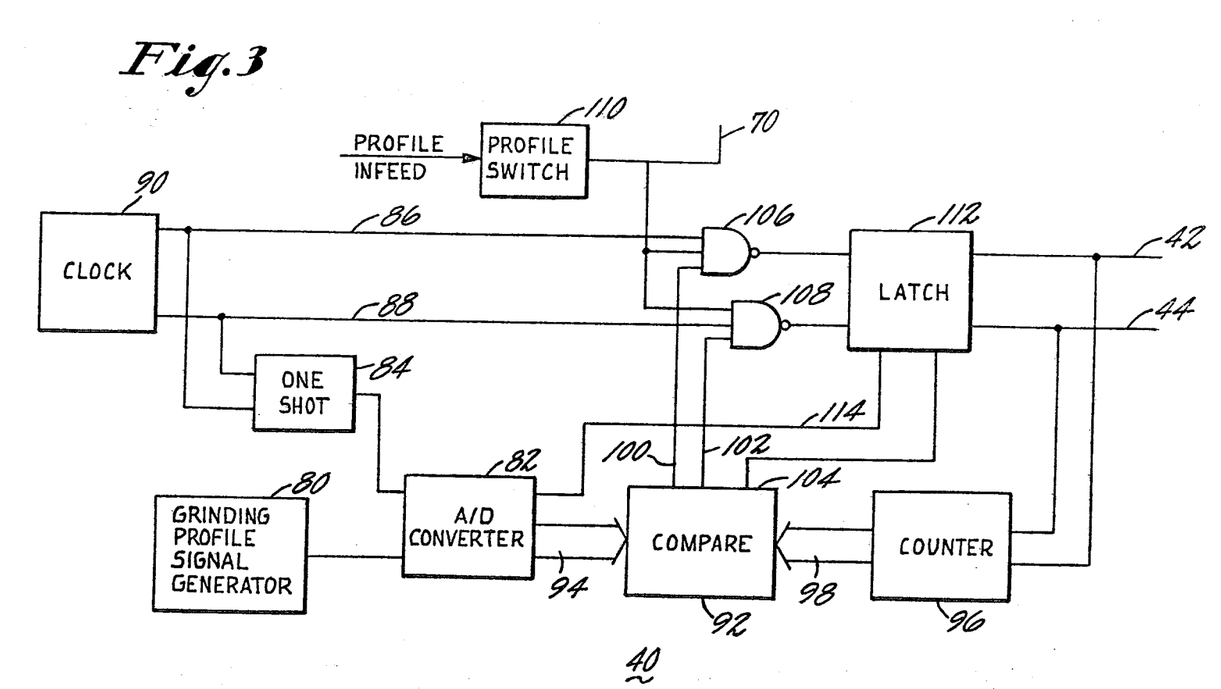
FIG. 3 is a detailed illustration of a grinding profile command circuit present within the digital control system of FIG. 2.

Referring now to FIG. 3, the profile command circuit 40 is illustrated in detail. The circuit includes a grinding profile signal generator 80 which is operative to produce an analog signal. The analog signal is preferably a DC voltage which varies in accordance with the amount of grinding that is to be accomplished along the length of the workpiece roll. The generation of the DC voltage is synchronized with respect to the movement of the grinding wheel 10 along the length of the workpiece roll. In this manner, the amount of infeed necessary to produce the particular grinding profile is defined along the length of the workpiece roll. It is to be noted that this type of analog signal generation is conventional and well known in the art.

Figure 4:
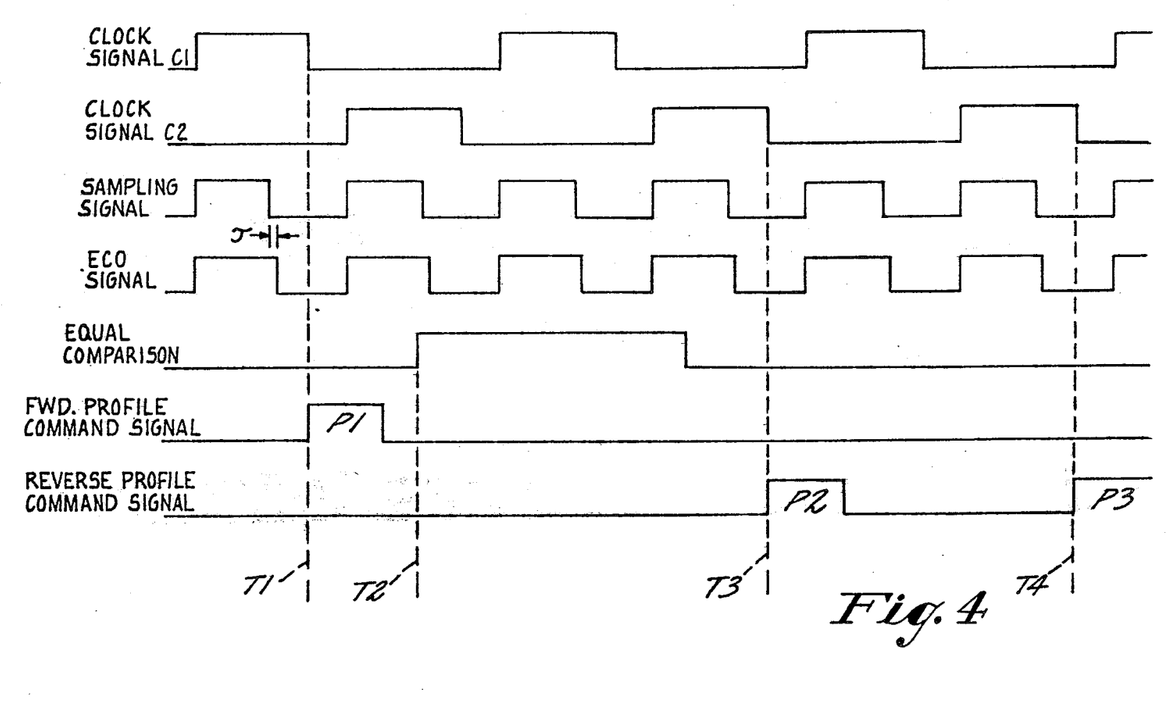
FIG. 4 is a timing diagram illustrating various signals present within the digital logic of FIG. 3.

The analog signal that is thus produced by the grinding profile signal generator 80 is applied to an analog to digital converter 82 (hereinafter referred to as an A/D converter). The A/D converter 82 is operative to sample and digitize the analog signal each time a sampling pulse is received from a one-shot circuit 84. The one-shot circuit 84 is in turn activated by a pair of non-overlapping clock signals present on a pair of lines 86 and 88. These clock signals are generated by a clock circuit 90. The non-overlapping clocking signals are illustrated as clock signals CI and C2 in FIG. 4. Clock signal C1 is present on the line 86 whereas clock signal C2 is present on the line 88. It is to be appreciated that the generation of these non-overlapping clocking signals can be done in a conventional manner well known in the art. The sampling signal occurring at the output of the one-shot circuit 84 is also illustrated in FIG. 4. The sampling signal reflects a successive triggering of the one-shot circuit 84 by the leading edges of the pulses occurring in the clock signals CI and C2. The sampling signal dictates the rate of sampling by the A/D converter 82. The A/D converter 82 thereafter performs the analog to digital conversion and indicates when the conversion has been completed. This latter indication occurs in the form of an end of conversion signal which is illustrated in FIG. 4 as an EOC signal. It is to be noted that the EOC signal changes signal state shortly after the sampling signal. This time delay of $\tau$ merely reflects the conversion time of the A/D converter. The significance of this signal will be explained in detail hereinafter.

Referring again to FIG. 3, it is noted that the digital output of the A/D converter 82 is applied to the left side of a compare circuit 92 via a bus 94. The bus 94 preferably comprises twelve separate bit lines which are individually received by the compare circuit 92. This allows for a maximum generated digital command of up to four thousand ninety-six units. The right side of the compare circuit 92 also receives a twelve bit digital count from a counter 96 via a bus 98. As will be explained in detail hereinafter, the digital counter 96 maintains a current count of actually commanded infeed pulses occurring on the output lines 42 and 44.

The compare circuit 92 is operative to continuously compare the output from the A/0 converter 82 with the output of the digital counter 96. The compare circuit 92 is operative to generate a logically high signal on a line 100 when the numerical value of the bits present on the bus 94 is greater than the numerical value of the bits present on the bus 98. The compare circuit is furthermore operative to generate a logically high signal on a line 102 when the numerical value of the bits present on the bus 98 is greater than the numerical value of the bits present on the bus 94. The compare circuit is also operative to generate a logically high signal on a line 104 when the bits present on the bus 94 are equal to the numerical value of the bits present on the bus 98. The signal on the line 100 is applied to a NAND gate 106 whereas the signal present on the line 102 is applied to a NAND gate 108. The NAND gates 106 and 108 also receive an enabling signal from a profile switch 110. The profile switch 110 is switched logically high in response to a profile infeed command activation by either the operator or a higher order control system. This logically high condition is transmitted to the forward digital command circuit 48 via the line 70. The logically high signal from the profile switch 110 allows the NAND gate 106 to now become enabled by a logically high signal on the line 100 indicating that the numerical value of the bits present on the bus 94 is greater than the numerical value of the bits present on the bus 98. This allows the NAND gate 106 to gate the clock pulse signal C1 present on the line 86. The clock pulses are applied to a latch circuit 112. It is to be noted that the NAND gate 108 will be inhibited during this time by a logically low signal on the line 102. This situation will reverse at such time as the comparison by the compare circuit 92 indicates that the numerical value of the bits present on the bus 94 is less than the numerical value of the bits present on the bus 98. When this occurs, the signal on the line 102 will be logically high so as to thereby enable the NAND gate 108 whereas the signal present on the line 100 will be logically low so as to inhibit the NAND gate 106. This will result in the clock pulse signal C2 present on the line 88 being gated through the NAND gate 108 so as to be applied to the latch circuit 112.

In addition to receiving the gated signals from the NAND gates 106 and 108, the latch circuit 112 also receives the end of conversion signal EOC from the A/D converter 82 via a line 114. The latch circuit 112 furthermore receives the signal present on the line 104 indicating that the numerical value of the bits present on the bus 94 is equal to the numerical value of the bits present on the bus 98. Referring to FIG. 4, the operation of the latch circuit is illustrated in response to these various signals. In this regard, it is first of all to be noted that the end of conversion signal present on the line 114 and the equal comparison signal present on the line 104 must both be logically low in order to enable the latch circuit 112. As can be seen in FIG. 4, the equal comparison signal is logically low for long periods of time signifying that an equal comparison is not occurring in the compare circuit 92. On the other hand, the EOC signal is only periodically low following the completion of each digital conversion by the A/D converter 82. These logically low signal levels occur at specific periods of time relative to the clock signals C1 and C2. Specifically, a logically low level is present in the EOC signal each time a trailing edge is encountered for a clock pulse in either the C1 or C2 signals. In this manner, the EOC signal periodically enables the latch circuit 112 for the same type of signal transition occurring in each of the clock signals. At this time, parallel data is now valid for comparison.

Assuming that the NAND gate 106 has been enabled in response to an indication that the numerical value of the bits present on the bus 94 is greater than the numerical value of the bits present on the bus 98, the clock pulses in the clock signal C1 will be inverted through the NAND gate 106 and applied to the latch circuit 112. The latch circuit will be operative to latch onto the inverted trailing edge of each gated clock pulse so as to thereby produce a pulse on the output line 42. This is illustrated in FIG. 4 as a pulse P1 occurring in a forward profile command signal present on the output line 42. It is to be noted that the pulse P1 is in response to a trailing edge in the clock signal C1 occurring at Time $T_1$. This will continue to occur until such time as an equal comparison is noted on the line 104. This occurs in FIG. 4 at a time $T_2$. At this time, the latch circuit 112 will be disabled by the logically high signal level of the equal comparison signal. As can be seen in FIG. 4, the forward profile command signal does not react to the next trailing edge in the C1 clock signal. The final set of signal conditions to be illustrated in FIG. 4 is that of the numerical value of the bits present on the bus 94 being less than the numerical value of the bits present on the bus 98. When this occurs, the compare circuit enables the NAND gate 108 which in turn gates the clock signal C2 through to the latch circuit 112 in an inverted fashion. The latch circuit 112 will be operative to latch onto the inverted trailing edge of each gated clock pulse so as to thereby produce a pulse on the output line 44. This is illustrated in FIG. 4 as pulses P2 and P3 occurring in a reverse profile command signal present on the line 44. It is to be noted that these pulses occur in response to trailing edges present in the clock signal C2 at times $T_3$ and $T_4$.

Referring to FIG. 3, the forward and reverse pulses present on the lines 42 and 44 are applied to the counter 96. The counter 96 is operative to incrementally count upwardly in response to forward pulses and to incrementally count downwardly in response to reverse pulses. This count is reflected in the individual bit lines within the bus 98 that are applied to the compare circuit 92. In this manner, the compare circuit 92 is able to continuously compare the count of the commanded profile infeed issuing on the lines 42 and 44 with respect to the most recently digitized profile signal as reflected on the bit lines within the bus 94.

Figure 5:
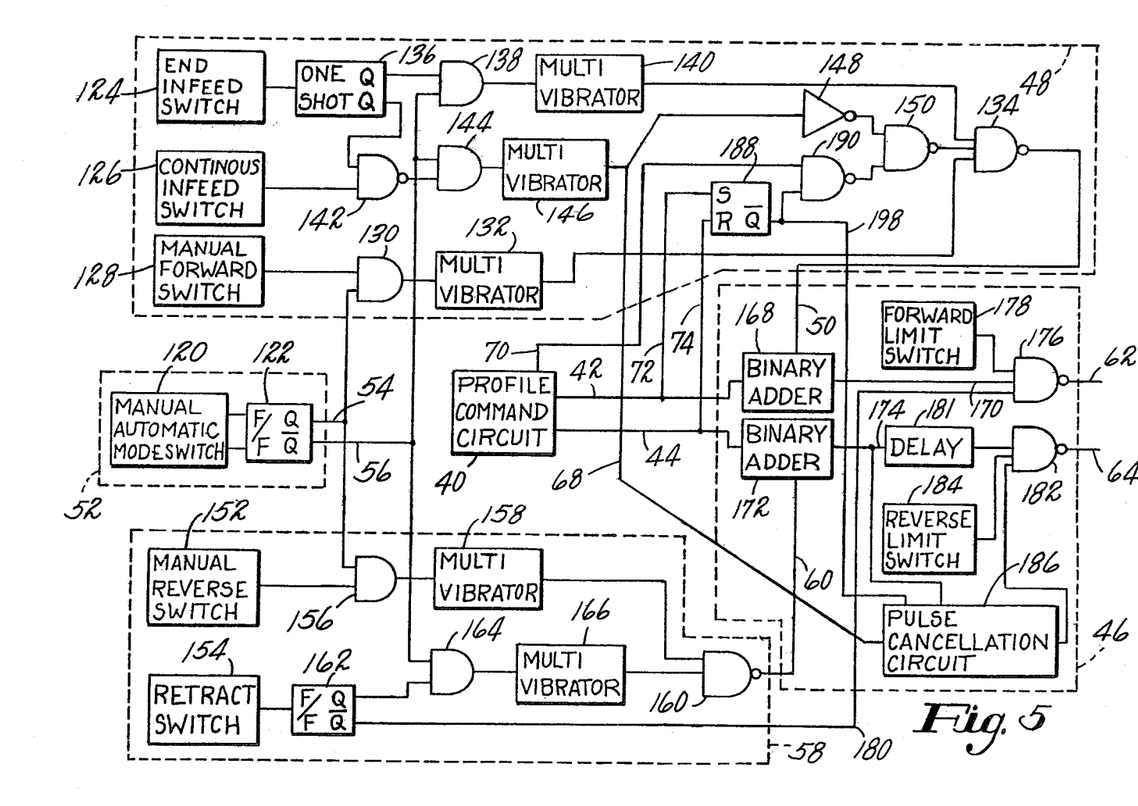
FIG. 5 is a detailed illustration of certain control circuitry present within the digital control system of FIG. 2.

Having now discussed the profile command circuit 40 in detail, it is now appropriate to turn to some of the other digital circuits within the overall control system of FIG. 2. In this regard, FIG. 5 illustrates in further detail, the manual/automatic mode selection 52, the forward digital command circuit 48, the digital command output circuit 46, and the reverse digital command circuit 58. The aforementioned circuits are all illustrated within dotted outlines in FIG. 5.

The manual/automatic mode selection circuit 52 is seen to consist of a manual/automatic mode switch 120 which is connected to a flip-flop 122. The assertion and negation outputs of the flip-flop 122 are applied to both the forward digital command circuit 48 and the reverse digital command circuit 58. The assertion signal is carried over the line 54 whereas the negation signal is carried over the line 56. In accordance with the invention, the assertion output of the flip-flop 122 will be logically high for a selection of the manual mode by the manual/automatic mode switch 120. This will result in a logically high bilevel signal on the line 54 and a logically low bilevel signal on the line 56. On the other hand, a selection of an automatic mode by the manual/automatic mode switch 120 will set the flip-flop 122 logically low. This will result in a logically low bilevel signal on the line 54 and a logically high bilevel signal on the line 56.

Referring now to the forward digital command circuit 48, it will be remembered that this circuit receives infeed commands of: end infeed, continuous infeed, and manual infeed. These various input commands are provided for by an end infeed switch 124, a continuous infeed switch 126, and a manual forward switch 128. Assuming that a manual mode has been selected through appropriate activation of the manual/automatic mode switch 120, an AND gate 130 will be enabled by virtue of a logically high bilevel signal on the line 54. Activation of the manual forward switch 128 will produce a logically high signal which will be gated through the thus enabled AND gate 130 so as to thereby be applied to a multivibrator 132. The thus activated multivibrator 132 is operative to produce a train of pulses having a predefined frequency. The multivibrator 132 is a standard integrated circuit which is capable of being set both as to frequency and to pulse configuration. The pulse train emanating from the multivibrator 132 is applied to a NAND gate 134. As will become apparent hereinafter, the NAND gate 134 will be otherwise enabled so as to thereby gate the pulse train generated by the multivibrator 132. This pulse train is applied to the digital command output circuit 46 via the line 50. This pulse train will be interpreted by the digital command output circuit as a forward movement command in the amount dictated by the number of command pulses gated from the NAND gate 134.

Turning now to the pulse generation capabilities of the forward digital command circuit 48 for an automatic mode, the end infeed will be discussed first. It will be remembered that an end infeed is to be accomplished at the end of the workpiece roll. This is accomplished by activating the end infeed switch 124 which in turn triggers a one-shot 136. The one-shot 136 produces a pulse of a predefined width which defines the time frame for the end grinding of the workpiece roll. This pulse is applied to an AND gate 138 which will be enabled during an automatic mode. Specifically, the bilevel signal will be logically high on the line 56 for an automatic mode selection. The thus enabled AND gate 138 will gate the pulse output from the one-shot 136 so as to trigger a multivibrator 140. The multivibrator 140 will produce a pulse train having a pre-defined frequency for the period of time dictated by the gated pulse from the AND gate 138. This pulse train will be gated through the NAND gate 134 and applied to the digital command output circuit 46 via the line 50. This pulse train will result in a forward infeed of the amount defined by the thus applied pulse train.

It is to be noted that the negation output of the one-shot circuit 36 is applied to a NAND gate 142. The negation output of the one-shot circuit 136 will be logically low during an end infeed grinding operation. This will disable the NAND gate 142 until such time as the end infeed grinding has been completed. It will be remembered that this period is defined by the width of the pulse from the one-shot circuit 136. When the end infeed grinding has been thus completed, the now enabled NAND gate 142 will respond to the signal state of the continuous infeed switch 126. An activated continuous infeed switch 126 will produce a logically low signal at its output. This logically low signal will result in the enabled NAND gate 142 switching logically high. This output signal condition of the NAND gate 142 will be gated through an AND gate 144 during an automatic mode. The thus gated signal is applied to a multivibrator 146 which is set to produce a relatively low frequency train of pulses at its output. The frequency of pulses at this output is lower then the frequencies of all other pulse trains generated within the forward digital command circuit as well as the profile and reverse digital command circuits. This relatively low frequency pulse output is inverted by an inverter 148 and applied to a NAND gate 150. The NAND gate 150 normally reinverts the low frequency pulse output from the multivibrator 146 and delivers the same to the NAND gate 134. The pulses gated by the NAND gate 134 appear on the line 50. This particular low frequency train of pulses is operative to define a continuous infeed which compensates for the wear of the grinding wheel.

As has been previously discussed, the NAND gate 134 must be appropriately enabled so as to respond to the various pulse trains emanating from the multivibrators 132, 140 and 146. This is accomplished by requiring each of these multivibrators to generate negative pulses which end in a logically high signal state upon completion of each pulse and at the end of a train of pulses. In this manner, the logically high enabling signal conditions will always be present at the NAND gate 134.

Referring now to the reverse digital command circuit 58, it will be remembered that this circuit is responsive to both a manual reverse and a retract command. These two external commands are provided by a manual reverse switch 152 and a retract switch 154. Referring first to the manual reverse switch 152, it is seen that the output of this switch is applied to an AND gate 156. The AND gate 156 will be enabled during a manual mode so as to thereby gate the logically high signal condition to a multivibrator 158. The multivibrator 158 will generate a pulse train as long as the manual reverse switch 152 remains activated. This pulse train is gated by a NAND gate 160 so as to form a stream of reverse command pulses on the line 60. This stream of pulses is applied to the digital command output circuit 46 which in turn commands the grinding wheel to move backwardly and away from the workpiece roll.

Referring now to the retract switch 154, it is seen that the output of this switch is connected to a flip-flop 162. The activation of the retract switch 154 will set the flip-flop 162 logically high so as to result in a logically high signal being applied to an AND gate 164. The AND gate 164 will be enabled by a logically high signal on the line 56 for an automatic mode of operation. The output signal from the flip flop 162 will hence be gated by the AND gate 164 and applied to a multivibrator 166. The multivibrator 166 will produce a train of pulses of predefined frequency which are applied to the NAND gate 160. The NAND gate 160 will be enabled due to the inoperative logically high signal state of the multivibrator 158. The resulting train of pulses appearing on the line 60 will result in a retraction of the grinding wheel from the workpiece.

It is to be noted from the above that the NAND gate 160 is maintained in an enabled state due to the output signal state of the multivibrator 158. The multivibrator 166 will similarly end in a logically high signal state so as to enable the NAND gate 160 for receipt of any negative pulses from an activated multivibrator 158. In this manner, the multivibrators 158 and 166 are initially set up in much the same manner as the multivibrators 132, 140 and 146 within the forward digital command circuit.

Referring now to the digital command output circuit 46, it will be remembered that this circuit is operative to generate motor control pulses on either a line 62 or a line 64 in response to having received various pulse signals at its inputs. The input signals to the digital command output circuit are produced by the profile command circuit 40, the forward digital command circuit 48, and the reverse digital command circuit 58. As has been previously discussed, two of these pulse signals are indicative of forward infeed whereas two other pulse signals are indicative of reverse infeed movement of the grinding wheel.

The pulse signals indicative of a forward infeed movement of the grinding wheel appear on the line 42 from the profile command circuit and the line 50 from the forward digital command circuit 48. These signals are applied to a binary adder 168 within the digital command circuit 46. The binary adder 168 is operative to perform a binary addition for each pulse received on either the line 42 or the line 50. Each such binary add operation by the binary adder 168 results in a forward motor control pulse being produced on an output line 170.

The digital command output circuit 46 is seen to also include a binary adder 172. The binary adder 172 receives pulses indicating a reverse infeed movement from both the profile command circuit 40 and the reverse digital command circuit 58. The pulses from the profile command circuit 40 arrive via the line 44 whereas the pulses from the reverse digital command circuit 58 arrive via the line 60. The binary adder 172 is operative to perform a binary addition for each so received pulse on either the line 44 or the line 60. Each such binary add operation by the binary adder 172 results in a reverse motor control pulse being produced on an output line 174.

It is to be noted that the binary adders 168 and 172 perform the function of producing a motor control pulse at their respective outputs in response to having received a pulse at either of their two respective inputs. In other words, a pulse is generated at the output of each binary adder for each and every pulse received at its respective inputs. It is to be appreciated that this is the overall system function performed by the binary adder circuits 168 and 172.

The motor control pulses produced at the output of the binary adder 168 and appearing on the line 170 are applied to a NAND gate 176. The NAND gate 176 will normally be enabled by the output signal states of a forward limit switch 178 and the negation output of the flip-flop 162 within the reverse digital command circuit 58. It will be remembered that the flip-flop 162 is only set to a logically high signal state during a retract operation. This will cause the negation output to be logically low thereby producing a signal on a line 180 which disables the NAND gate 176. This effectively prevents any forward commands during a retract operation. The NAND gate 176 will otherwise be enabled unless the forward limit switch 178 is triggered so as to thereby produce a logically low signal state. The forward limit switch 178 defines the limit of forward movement of the grinding wheel. The normally enabled NAND gate 176 will hence gate the forward motor control pulses present on the line 170 unless the forward limit has been reached. These pulses will appear in inverted fashion on the line 62. These pulse signals will thereafter be applied to the motor control 66 so as to ultimately cause the infeed motor 20 to move the grinding wheel forward relative to the workpiece roll.

Referring now to the motor control pulses appearing at the output of the binary adder 172 on the line 174, it is seen that these pulses are delayed by a delay circuit 181 and applied to a NAND gate 182. The NAND gate 182 will normally be enabled by the output signal states of a reverse limit switch 184 and a pulse cancellation circuit 186. This will result in any pulses appearing on the line 174 being normally gated onto the line 64. It will be remembered from the discussion of FIG. 2 that motor control pulses on the line 64 are applied to the motor control 66 so as to thereby ultimately produce a reverse motion of the grinding wheel.

The exceptions to the above gating of motor control pulses onto the line 64 occur whenever the reverse limit switch 184 has been activated or whenever the pulse cancellation circuit 186 has become operational. The reverse limit switch 184 will only be activated in the event that the grinding wheel reaches a predefined limit of outward movement relative to the workpiece. At this time, the reverse limit switch will go logically low so as to disable the NAND gate 182 and hence prevent any further retraction of the grinding wheel.

The pulse cancellation circuit 186 will become operational in a manner which will now be described. It is to be noted that the pulse cancellation circuit 186 is connected to the output of the multivibrator 146 via the line 68. The pulse cancellation circuit 186 is operative to internally process a pulse appearing on the line 68 whenever the profile command circuit generates a reverse profile command pulse on the line 44. The manner in which this is accomplished will be described in detail hereinafter. For the moment, it is merely to be understood that the processed pulse will effectively cause the pulse cancellation circuit 186 to go low thereby disabling the NAND gate 182 for a period of time necessary to cancel the gating of a reverse motor control pulse onto the line 64. The net result is that a pulse generated by the multivibrator 146 to compensate for wheel wear is set off against a reverse motor control pulse that would otherwise issue from the NAND gate 182.

It is to be noted that any pulse from the multivibrator 146 that is set off against a reverse motor control pulse in the aforesaid manner is never processed through to the motor control 66 as a forward motor control pulse. Referring to the forward digital command circuit 48, it is seen that an RS flip flop 188 is connected to the output lines 42 and 44 of the profile command circuit 40. In this regard, the set input of the flip-flop 188 is connected to the output line 42 via the line 72 whereas the reset input of the flip-flop 188 is connected to the output line 44 via the line 74. It will be remembered that the line 42 carries the forward profile command signal of FIG. 4 whereas the line 44 carries the reverse profile command signal of FIG. 4. Referring to FIG. 4, it is seen that each of these profile command signals comprises a train of positive pulses. The profile command circuit 40 can only produce one of these trains of pulses at any one time. In this regard, the RS flip-flop 188 of FIG. 5 will set high anytime a train of forward pulses occurs on the line 42. The RS flip-flop 188 will reset low anytime a train of reverse profile command pulses occurs on the line 44. This will cause the negation output of the RS flip-flop 188 to produce a logical high signal in response to a reverse profile command pulse train occurring on the line 44. This logically high signal condition will persist until such time as a forward profile command pulse train again occurs on the line 42.

The negation output signal from the RS flip-flop 188 is applied to a NAND gate 190. The NAND gate 190 also receives a bilevel signal from the profile command circuit 40 via the line 70. It will be remembered from the discussion of FIG. 3 that the bilevel signal on the line 70 will be logically high as long as the profile command circuit 40 is active. This means that the NAND gate 190 will be responsive to the negation output of the flip-flop 188. Hence when the negation output switches logically high in response to the generation of a reverse profile command pulse by the profile command circuit, the NAND gate 190 will switch low. This will, in turn, disable the NAND gate 150 from gating the pulse from the multivibrator 146 onto the line 50.

The negation output of the flip-flop 188 will remain logically high until such time as a forward profile command pulse issues on the line 42. This will result in the flip-flop 188 changing signal states so as to produce a logically low signal to the NAND gate 190. The NAND gate 190 will, in turn, switch logically high so as to enable the NAND gate 150 to respond to a pulse generated by the multivibrator 146. In this manner, a compensation pulse will issue on the line 50 so as to be added by the binary adder 168 to the forward profile command pulses present on the line 42.

Figure 6:
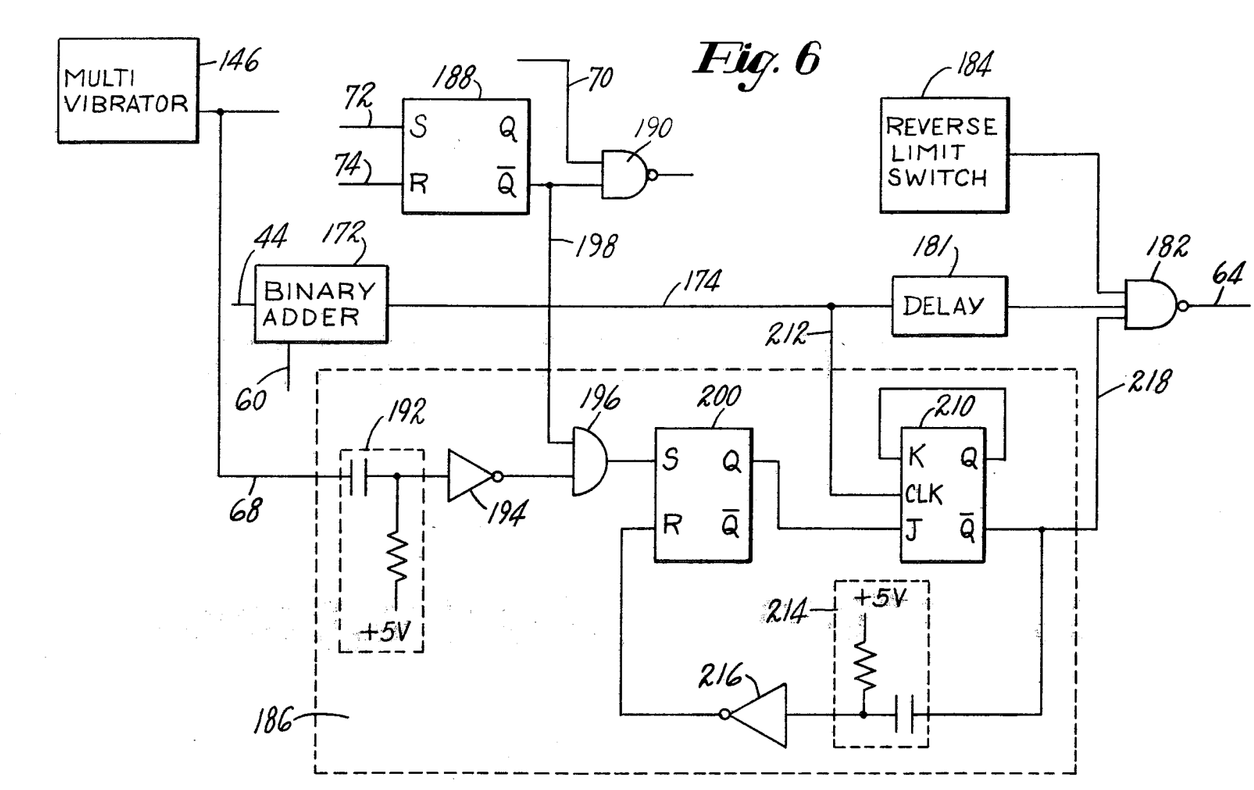
FIG. 6 is a further detailed illustration of certain control circuitry present within FIG. 5.
Figure 7:
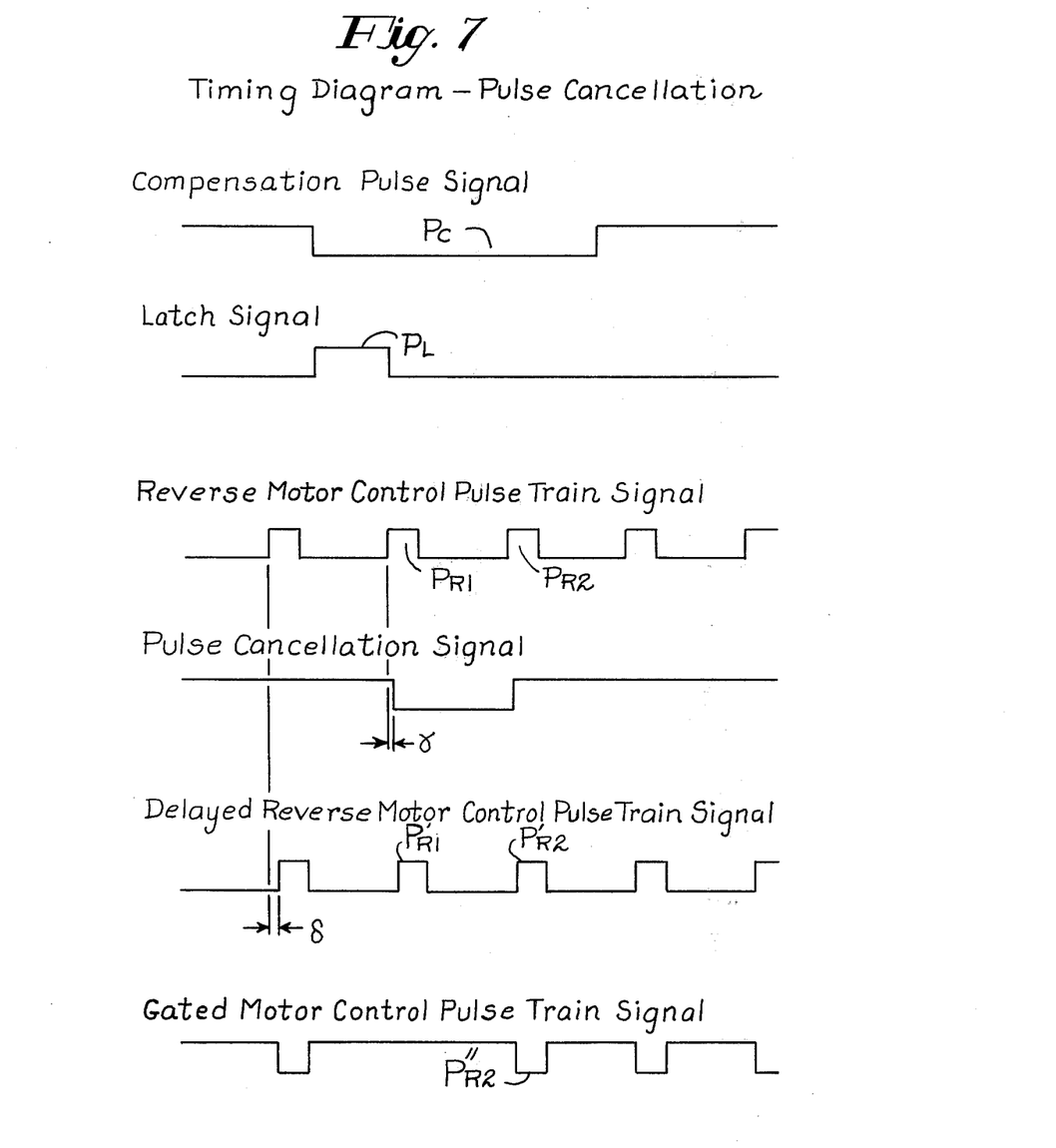
FIG. 7 is a timing diagram illustrating various signals present within the circuitry of FIG. 6.

Referring to FIG. 6, the pulse cancellation circuit 186 is illustrated in detail relative to those circuits which it interfaces with in FIG. 5. In particular, the pulse cancellation circuit is seen to receive the compensation pulse signal on the line 68 from the multivibrator 146. This signal is illustrated in the timing diagram of FIG. 7. The compensation pulse signal is differentiated by an RC circuit 192, inverted by an inverter 194 and applied to an AND gate 196. It is to be appreciated that a narrow positive spike will hence occur at the AND gate 196 in response to the negative transition occurring at the leading edge of the compensation pulse $P_c$ present in the compensation pulse signal of FIG. 7. This narrow positive spike will only be further processed by the pulse cancellation circuit if the AND gate 196 has otherwise been enabled by the negation output signal from the flip-flop 188. This signal is applied to the AND gate 196 via a line 198. It will be remembered from the discussion of FIG. 5 that this signal is logically high only when the profile command circuit has generated at least one reverse profile command pulse. This effectively controls the time when the pulse cancellation circuit 186 is thus operative. Assuming that the signal on the line 198 is logically high so as to make the pulse cancellation circuit operative, the AND gate 196 will gate the narrow positive spike through to the set input of an RS flip-flop 200. The momentary positive spike will set the flip-flop 200 logically high. This will produce a logically high latch signal at the assertion output of the RS flip-flop 200. Referring to FIG. 7, the latch signal occurring at the assertion output of the RS flip-flop 200 is seen to have a latch pulse $P_L$. The latch pulse $P_L$ is applied to the J input of a clocked JK flip-flop 210. The clock signal for the flip-flop 210 is obtained from the output line 174 of the binary adder 172 via a connecting line 212. The binary adder 172 will be producing a train of positive pulses on the line 174 in response to the reverse profile command signal present on the line 44. This train of pulses is labeled in FIG. 7 as a reverse motor control pulse train signifying a reverse or retraction type of commanded movement for the grinding wheel. It is to be noted that the pulse frequency of the reverse motor control pulse train is appreciably greater than the relatively low frequency of the compensation pulse signal wherein only one pulse $P_c$ occurs in FIG. 7. The leading edge of a pulse $P_R$ in the reverse motor control pulse train clocks in the signal state of the latch signal appearing at the J input of the flip-flop 210. This causes the negation output of the flip-flop 210 to switch low as is indicated by the pulse cancellation signal in FIG. 7. It is to be noted that the pulse cancellation signal switches low a short time indicated by $\gamma$ after the leading edge of the pulse $P_R$. This is attributable to the propagation delay inherent in the JK flip-flop 210.

Referring to FIG. 6, the pulse cancellation signal occurring at the negation output is differentiated by an RC circuit 214, inverted by an inverter 216 and applied to the reset input of the RS flip-flop 200. This results in a narrow positive spike being applied to the reset input shortly after the negative transition in the pulse cancellation signal. This resets the RS flip-flop 200 logically low. Referring to the JK flip-flop 210, it is seen that the Q output is fed back to the K input. This results in the flip-flop being clocked low when the next pulse, $P_{R2}$, occurs in the reverse motor control pulse train present on the line 174. It is hence to be appreciated that the pulse cancellation signal produced at the negation output of the flip-flop 210 will remain logically low until the next pulse $P_{R2}$ occurs in the reverse motor control pulse train of FIG. 7. This pulse cancellation signal constitutes the output signal of the pulse cancellation circuit 186. Referring to FIG. 6, it is seen that this signal is delivered to the NAND gate 182 via an output line 218. It is to be appreciated that the pulse cancellation signal will disable the NAND gate 182 during the time in which it is logically low. The NAND gate 182 also receives a bilevel signal from the reverse limit switch 184 as well as a delayed reverse motor control pulse train signal from the binary adder 172. The bilevel signal from the reverse limit switch 184 will normally be logically high unless the grinding wheel has been retracted to a limit defined by the switch. The delayed reverse motor control pulse train signal will, on the other hand, comprise any delayed pulses generated by the binary adder 172. The delay is introduced into these pulses by the delay circuit 181.

Referring to FIG. 7, a delayed reverse motor control pulse train resulting from the delay introduced by the delay circuit 181 is illustrated. It is seen that the delayed pulse train is delayed by an amount $\delta$ relative to the reverse pulse train. The delay $\delta$ must be greater than the propagation delay $\gamma$ inherent in the JK flip-flop 210. This assures that the delayed pulse $P'_{R1}$ will not arrive at the NAND gate 182 prior to the pulse cancellation signal dropping logically low. As a result, the NAND gate 182 fails to gate the delayed pulse $P'_{R1}$ in an inverted form as is illustrated in the gated motor control pulse train signal appearing in FIG. 7. In particular, it is seen that the output of the NAND gate 182 remains logically high during the entire duration of the delayed pulse $P'_{R1}$. The NAND gate 182 subsequently responds to the delayed pulse $P'_{R2}$ as is illustrated by the gated and inverted pulse $P''_{R2}$. This gating of the delayed pulse $P'_{R2}$ occurs by virtue of the pulse cancellation signal switching high prior to the NAND gate 182 receiving the delayed pulse $P'_{R2}$. It is hence to be appreciated that a single pulse has been cancelled in the gated motor control pulse train appearing on the line 64 of FIG. 6. This results in one less pulse being applied to the motor control 66 of FIG. 2 which controls the reverse movement of the infeed motor 20. In this manner, the infeed motor 20 does not experience an isolated pulse that would otherwise be present on the forward line 62 to correct for wear in the grinding wheel. This allows the infeed motor 20 to smoothly retract the grinding wheel while still compensating for grinding wheel wear.

It is to be understood from the above that a preferred embodiment has been disclosed of a digital control system for a roll grinding machine. It is to be appreciated that alternative digital logic may be substituted for elements of the preferred embodiment without departing from the scope of the present invention.

What is claimed is:

1. A roll grinding machine having a system for controlling the infeed positioning of a grinding wheel relative to the roll, said system comprising:
    means for defining a grinding profile along the length of the roll;
    means, responsive to the defining of a grinding profile for selectively producing first and second trains of pulses; the first train of pulses defining an inward motion of the grinding wheel relative to the roll and the second train of pulses defining an outward motion of the grinding wheel relative to the roll;
    means for generating a pulse signal defining an additional inward motion of said grinding wheel relative to said roll; and
    means for selectively processing the pulse signal defining the additional inward motion of said grinding wheel so as to either add a pulse to the first train of pulses or cancel a pulse occurring in the second train of pulses.

2. The roll grinding machine of claim 1 wherein said means for selectively processing the pulse signal defining the additional inward motion of said grinding wheel comprises:
   means for adding a pulse occurring in the pulse signal to a first train of pulses generated by said means for selectively producing first and second trains of pulses; and
   means for cancelling a pulse in a second train of pulses generated by said means for selectively producing first and second trains of pulses.

3. The roll grinding machine of claim 2 wherein said means for selectively processing the pulse signal defining the additional inward motion of said grinding wheel further comprises:
   means, responsive to at least one of the train of pulses produced by said means for selectively producing first and second trains of pulses, for either enabling said adding means or said pulse cancellation means.

4. The roll grinding machine of claim 3 wherein said means for adding a pulse occurring in the pulse signal to a first train of pulses comprises:
   means, responsive to said enabling means, for gating a pulse occurring in the pulse signal;
   means for combining the gated pulse with the pulses occurring in the first train of pulses so as to produce a train of motor control pulses; and
   means, responsive to the train of motor control pulses, for moving the grinding wheel inwardly relative to the roll.

5. The roll grinding machine of claim 4 wherein the pulse signal defining the additional inward motion is a low frequency pulse signal relative to the first and second pulse trains, the low frequency pulse signal containing pulses indicative of the wear of said grinding wheel which occur during both inward and outward movements of the grinding wheel relative to the roll.

6. The roll grinding machine of claim 5 wherein said system for controlling the infeed positioning of the grinding wheel relative to the roll further comprises:
   a plurality of means for generating trains of pulses at predefined frequencies wherein each frequency defines a different type of inward motion of the grinding wheel relative to the roll, the pulse trains of predefined frequency being applied to said means for combining the gated pulse with the pulses occurring in the first train of pulses, whereby all pulses applied thereto are combined so as to produce a train of motor control pulses.

7. The roll grinding machine of claim 6 wherein said means for combining pulses further comprises:
   means, responsive to the pulse signal and the pulse trains of predefined frequency, for gating only one pulse at any one time so as to only allow one pulse defining one type of inward motion to be combined with the first pulse train at any one time.

8. The roll grinding machine of claim 3 wherein the pulse signal defining the additional inward motion is a low frequency pulse signal relative to the first and second pulse trains, the low frequency pulse signal containing pulses indicative of the wear of said grinding wheel which occur during both inward and outward movements of the grinding wheel relative to the roll.

9. The roll grinding machine of claim 3 wherein said means for cancelling a pulse in the second train of pulses comprises:
   means for receiving the pulse signal defining the additional inward motion of the grinding wheel;
   means for selectively gating the pulse signal defining the additional inward motion of the grinding wheel in response to said enabling means;
   means for generating a pulse cancellation signal in response to the selectively gated pulse signal; and
   means, responsive to the pulse cancellation signal, for cancelling a pulse in the second train of pulses.

10. The roll grinding machine of claim 9 wherein said means for generating a pulse cancellation signal comprises:
    means, responsive to a pair of successive pulses in the second train of pulses, for generating the pulse cancellation signal whereby said means for cancelling a pulse is operative to cancel one of the pair of successive pulses.

11. The roll grinding machine of claim 2 wherein said means for cancelling a pulse in the second train of pulses comprises:
    means, responsive to a pulse occurring in the pulse signal defining the additional inward motion of said grinding wheel and to a pair of successive pulses occuring in the second train of pulses, for cancelling one of the pair of successive pulses.

12. The roll grinding machine of claim 1 wherein said system for controlling the infeed positioning of a grinding wheel further comprises:
    a plurality of means for generating trains of pulses at predefined frequencies wherein each frequency defines a different type of outward motion of the grinding wheel relative to the roll; and
    means for combining the pulse trains of predefined frequencies with the second pulse train from said means for selectively producing first and second pulse trains so as to form a train of motor control pulses.

13. The roll grinding machine of claim 12 wherein said means for selectively processing the pulse signal defining the additional inward motion of said grinding wheel comprises:
    means for receiving the pulse signal defining an inward motion of the grinding wheel;
    means for selectively gating the pulse signal defining the additional inward motion of the grinding wheel in response to said enabling means;
    means for generating a pulse cancellation signal in response to the selectively gated pulse signal; and
    means, responsive to the pulse cancellation signal, for cancelling a pulse in the train of motor control pulses.

14. The roll grinding machine of claim 13 wherein said means for generating a pulse cancellation signal comprises:
    means, responsive to a pair of successive pulses, in the train of motor control pulses, for generating the pulse cancellation signal whereby said means for cancelling a pulse is operative to cancel one of the pair of successive pulses.

15. A system for controlling the infeed positioning of a grinding wheel relative to a workpiece roll, said system comprising:
    means for generating first and second types of pulse trains associated with an overall predetermined pattern of movement of the grinding wheel relative to the workpiece roll, the first type of pulse train defining an inward motion of the grinding wheel relative to the workpiece roll, the second type of pulse train defining an outward motion of the grinding wheel relative to the workpiece roll;

means for generating at least one pulse train of predefined frequency defining an additional movement of the grinding wheel in an inward direction toward the workpiece roll;

means for selectively combining certain pulses occurring in the pulse train of predefined frequency with the first type of pulse train associated with the overall pattern of movement;

means for selectively cancelling pulses in the second type of pulse train in conjunction with certain pulses occurring in the pulse train of predefined frequency; and means, responsive to at least one of the types of pulse trains associated with the overall predetermined pattern of movement, for enabling either said means for selectively combining certain of the pulses occurring in the train of pulses of predefined frequency or enabling said means for selectively cancelling pulses in the second pulse train.

16. The system of claim 15 wherein said means for selectively cancelling pulses in the second type of pulse train comprises:

means, responsive to a pair of successive pulses occurring in said second type of pulse train, for cancelling one of the pair of successive pulses when a pulse occurs in the pulse train of predefined frequency.

17. The system of claim 16 wherein said enabling means further comprises:

means, responsive to the second type of pulse train, for enabling said means for selectively cancelling pulses in the second type of pulse train and disabling said means for selectively combining certain pulses occurring in the pulse train of predefined frequency with the first type of pulse train.

18. The system of claim 15 further comprising:

means for generating at least one type of pulse train of predefined frequency associated with an additional movement in the outward direction away from the workpiece roll;

means for combining the pulse train of predefined frequency for the additional movement in the outward direction with the second type of pulse train so as to form a train of motor control pulses prior to any selective cancellation of pulses.

19. The system of claim 18 wherein said means for selectively cancelling pulses in the second pulse train comprises:

means, responsive to a pair of successive pulses in the train of motor control pulses, for cancelling one of the pair of successive pulses when a pulse occurs in the pulse train of predefined frequency associated with the additional movement in the outward direction.

20. The system of claim 15 wherein the pulse train of predefined frequency is a signal compensating for the wear of the grinding wheel and wherein the predefined frequency is a relatively low frequency compared to the frequencies of the first and second types of pulse trains associated with the overall predetermined pattern of movement.

* * * * *